US008502135B2

(12) United States Patent
Chace et al.

(10) Patent No.: US 8,502,135 B2
(45) Date of Patent: Aug. 6, 2013

(54) METHOD FOR THROUGH-CASING 3-PHASE SATURATION DETERMINATION

(75) Inventors: David M. Chace, Houston, TX (US); Rafay Z. Ansari, Spring, TX (US); Feyzi Inanc, Spring, TX (US); W. Allen Gilchrist, Jr., Fort Davis, TX (US); Elton Frost, Jr., Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 188 days.

(21) Appl. No.: 13/071,164

(22) Filed: Mar. 24, 2011

(65) Prior Publication Data

US 2012/0068060 A1  Mar. 22, 2012

Related U.S. Application Data

(60) Provisional application No. 61/317,414, filed on Mar. 25, 2010, provisional application No. 61/393,657, filed on Oct. 15, 2010.

(51) Int. Cl.
*G01V 5/10* (2006.01)
(52) U.S. Cl.
USPC ........ 250/269.7; 250/258; 250/259; 250/254; 250/264
(58) Field of Classification Search
USPC ................... 250/269.1–269.8, 258, 259, 254, 250/264, 301
See application file for complete search history.

(56) References Cited

U.S. PATENT DOCUMENTS

| 3,943,362 | A |   | 3/1976  | Peelman |         |
|-----------|---|---|---------|---------|---------|
| 4,021,666 | A | * | 5/1977  | Allen   | 250/265 |
| 4,697,078 | A |   | 9/1987  | Randall |         |
| RE36,012  | E | * | 12/1998 | Loomis et al. | 250/269.4 |
| 7,253,402 | B2 | * | 8/2007 | Gilchrist et al. | 250/269.7 |
| 7,294,829 | B2 |   | 11/2007 | Gilchrist |         |
| 7,365,308 | B2 | * | 4/2008 | Trcka et al. | 250/269.6 |
| 2007/0023624 | A1 | * | 2/2007 | Trcka et al. | 250/269.6 |
| 2007/0023625 | A1 | * | 2/2007 | Trcka et al. | 250/269.6 |
| 2007/0023626 | A1 | * | 2/2007 | Riley et al. | 250/269.6 |
| 2007/0246649 | A1 | * | 10/2007 | Jacobi et al. | 250/269.6 |
| 2009/0026359 | A1 | * | 1/2009 | Stephenson et al. | 250/269.7 |

OTHER PUBLICATIONS

Notification of Transmittal of the International Search Report and the Written Opinion of the International Searching Authority, or the Declaration; PCT/US2011/029913;Nov. 21, 2011.
Amadi, Samuel and Richard G. Hughes, "Evaluation of Behind-Pipe Saturation in a Miscible CO2 Flood." SPE/DOE Symposium on Improved Oil Recovery, Apr. 20-23, 2008, Tulsa, Oklahoma, USA. [Abstract Only].
Svor, T. Richard and Michael P., "A Three-Phase Quantitative Monitoring Method for CO2 Floods," SPE Enhanced Oil Recovery Symposium, Apr. 4-7, 1982. [Abstract Only].

* cited by examiner

*Primary Examiner* — David Porta
*Assistant Examiner* — Taeho Jo
(74) *Attorney, Agent, or Firm* — Cantor Colburn LLP

(57) ABSTRACT

A method for estimating a parameter of interest of an earth formation having a fluid contained in pores of the earth formation, the method includes: conveying a carrier through a borehole penetrating the earth formation; irradiating the earth formation with neutrons from a neutron source disposed at the carrier; measuring radiation emitted from the earth formation resulting from the irradiating using at least one detector; calculating or determining a mathematical parameter from radiation measured by the at least one detector; predicting values of the mathematical parameter over a range of values of an earth formation property; and comparing the mathematical parameter to the predicted values to estimate the parameter of interest.

21 Claims, 7 Drawing Sheets

METHOD FOR THROUGH-CASING 3-PHASE SATURATION DETERMINATION

CROSS REFERENCE TO RELATED APPLICATIONS

This application claims the benefit of U.S. Provisional Application Ser. No. 61/317,414 filed Mar. 25, 2010 and U.S. Provisional Application No. 61/393,657, filed Oct. 15, 2010, the entire disclosures of which are incorporated herein by reference.

BACKGROUND OF THE INVENTION

1. Field of the Invention

The present invention relates to techniques for estimating properties of an earth formation penetrated by a borehole and, in particular, to estimating saturation of three fluid phases in the earth formation.

2. Description of the Related Art

In commercial production of hydrocarbons, the hydrocarbons are extracted from reservoirs in earth formations. The reservoirs of hydrocarbons are generally contained in the pores of rock in the earth formations. The hydrocarbons can include oil and gas. In general, water in addition to the hydrocarbons may also be present in the pores. Hence, it is of considerable value to know where in the earth formation the types of hydrocarbons and associated concentrations are for efficient use of production resources.

Well logging is a technique used to perform measurements of an earth formation. In well logging, a logging instrument or tool is conveyed through a borehole penetrating the earth formation. The logging tool is configured to perform the measurements from within the borehole. Measurements are typically performed at various depths in the borehole. The measurements are associated with the depth at which they were performed to produce a log. Data from some of the logs may be used to determine relative amounts (i.e., saturation) of oil, gas or water in the pores of the earth formation.

Unfortunately, some of those logs have to be performed in an uncased borehole and typically require several passes through the borehole with different type of logging tools in order to get enough data to determine the saturation of a formation fluid. Even more data may be required to determine three-phase saturation, i.e., the saturation of oil, gas and water in the pores. If measurements to obtain the extra data have to be performed in an uncased borehole, then the risk of borehole damage can increase due to the delay in well completion.

Therefore, what are needed are techniques to efficiently determine a saturation of a fluid in an earth formation. Preferably, the techniques can be used in a cased borehole penetrating the earth formation and to determine a saturation of three fluids in the earth formation.

BRIEF SUMMARY OF THE INVENTION

Disclosed is an example of a method for estimating a parameter of interest of an earth formation having a fluid contained in pores of the earth formation, the method includes: conveying a carrier through a borehole penetrating the earth formation; irradiating the earth formation with neutrons from a neutron source disposed at the carrier; measuring radiation emitted from the earth formation resulting from the irradiating using at least one detector; calculating or determining a mathematical parameter from radiation measured by the at least one detector; predicting values of the mathematical parameter over a range of values of an earth formation property; and comparing the mathematical parameter to the predicted values to estimate the parameter of interest.

Also disclosed is an apparatus for estimating a parameter of interest of an earth formation having a fluid contained in pores of the earth formation, the apparatus includes: a carrier configured to be conveyed through a borehole penetrating the earth formation; a neutron source disposed at the carrier and configured to irradiate the earth formation; at least one detector configured to measure radiation emitted from the earth formation resulting from the irradiating; and a processor configured to: calculate or determine a mathematical parameter from radiation measured by the at least one detector; predict values of the mathematical parameter over a range of values of an earth formation property; and compare the mathematical parameter to the predicted values to estimate the parameter of interest.

Further disclosed is a machine readable medium for use with an apparatus for estimating a parameter of interest of an earth formation, the apparatus includes: a source of radiation configured to be conveyed in a borehole penetrating the earth formation and to irradiate the earth formation; and at least one detector configured to produce signals indicative of results of interactions of the radiation with nuclei of the earth formation; the medium includes instructions which enable a processor to: calculate or determine a mathematical parameter from radiation measured by at least one detector; predict values of the mathematical parameter over a range of values of an earth formation property; and compare the mathematical parameter to the predicted values to estimate the parameter of interest.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

DETAILED DESCRIPTION OF THE INVENTION

Figure 1:
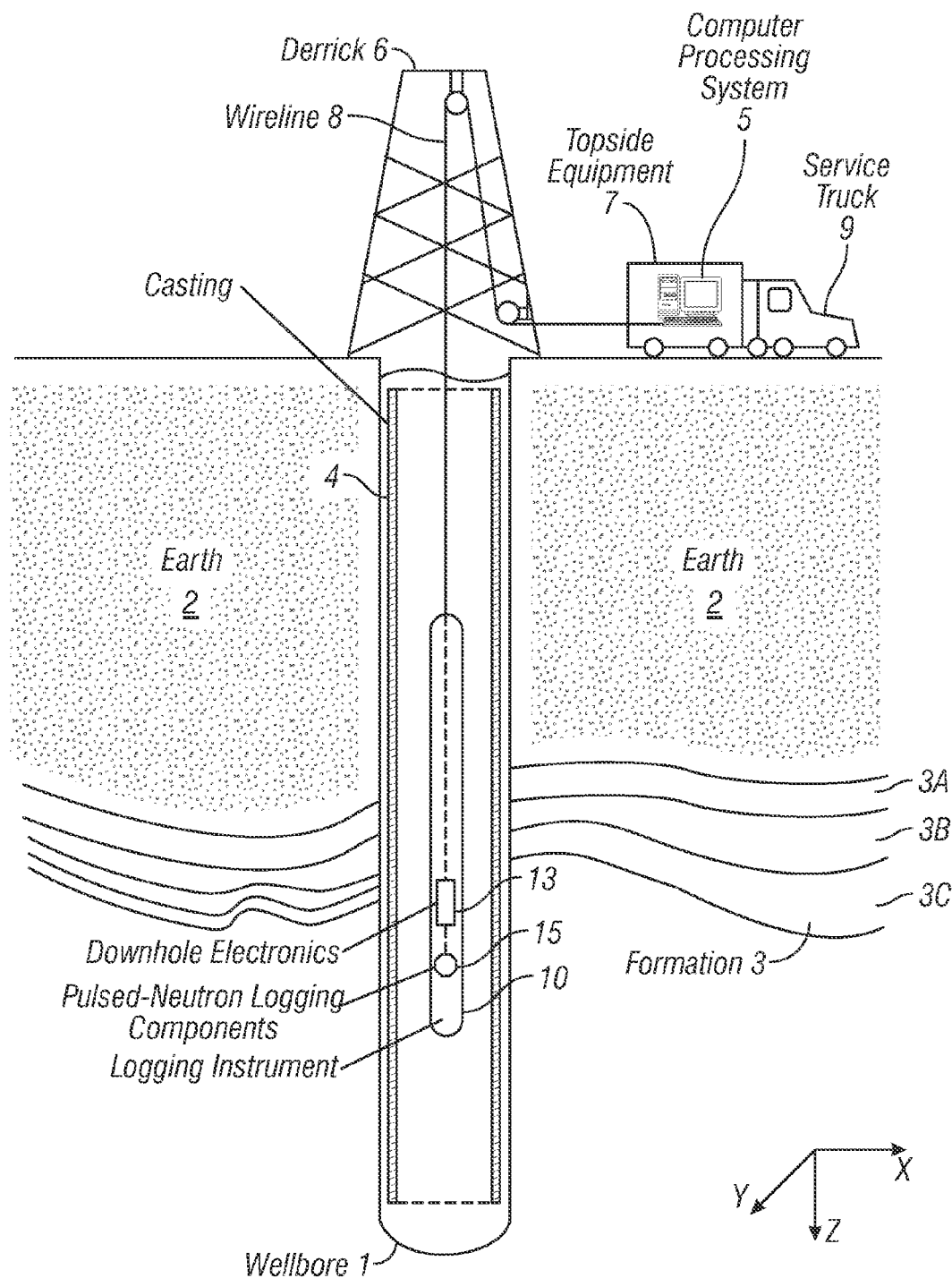
FIG. 1 illustrates an exemplary embodiment of a pulsed-neutron logging instrument disposed in a borehole penetrating an earth formation.

Disclosed are exemplary embodiments of techniques for efficiently estimating a saturation of a fluid in pores of an earth formation. The techniques, which include method and apparatus, call for using a pulsed-neutron logging instrument or tool to obtain measurements of the earth formation through a cased borehole penetrating the earth formation. The measurements can be obtained with one pass of the logging tool through the borehole.

The earth formation is irradiated with neutrons from a neutron source disposed at the logging tool in the borehole. Radiation in the form of gamma rays is emitted from the formation due to interactions between the neutrons and materials in the formation. The emitted radiation is detected (i.e. measured) by at least one detector. In one embodiment, the emitted radiation is detected by at least two detectors spaced different distances from the neutron source.

Two mathematical parameters are generated using radiation measurements from the at least one detector. The two mathematical parameters are then plotted together on a cross-plot graph of predicted values of the mathematical parameters for various values of saturation. The cross-plot graph includes two-phase saturation lines connecting one cross-plot value that corresponds to 100% saturation of one fluid to another cross-plot value that corresponds to 100% saturation of another fluid. By interpolating and/or extrapolating along the saturation line, the saturation of the two fluids relative to each other can be estimated. It can be appreciated that each saturation line can be linear or curved.

In one embodiment, the saturation of each of three fluids in the earth formation can be estimated. In this embodiment, the cross-plot includes three two-phase saturation lines that form a triangle. Each saturation line represents an amount of saturation of one fluid with respect to the other fluid represented by the line. The two mathematical parameters derived from the radiation measurements are then plotted on the cross-plot and can be any point on the triangle or interior to the triangle. A point on the triangle perimeter represents two phases (i.e., two fluids) present in the pores of formation. A point interior to the triangle represents three phases (i.e., three fluids) present in pores of the formation. It can be appreciated that each of the saturation lines forming the triangle can be linear or curved (i.e., curved inward or outward).

The predicted values of the two mathematical parameters are first predicted over a range of values of an earth formation property (such as porosity or variations in lithology or mineral volumes) that is different from the parameter of interest being estimated (i.e., the saturation). Then, for each value of the earth formation property, the two mathematical parameters are cross-plotted on the same graph for 100% saturation points for all three fluids, which represent the vertices of the triangle. These three vertices are interconnected by two-phase saturation lines. This resulting cross-plot graph is a compilation of saturation lines where the saturation lines correspond to one value of the earth formation property. For example, the predicted response of the pulsed-neutron logging tool over a range of porosity for various ranges of oil, water, and gas are modeled.

The data used to calculate the predicted values is data that is known about the well and the earth formation. This data may be obtained during the drilling of the borehole or from previous exploratory wells, which may be uncased or cased. The data can include properties measured at the surface, from measurements made under open-hole (i.e., uncased) or cased-hole conditions, from rock cuttings, and/or from formation samples. Examples of this data include at least one of a formation mineralogy, a formation porosity, a formation fluid density, a borehole fluid density, a borehole diameter, a casing diameter, an equation of state, and a response characteristic of the at least one detector. In one embodiment, a Monte Carlo simulation is used to predict the values of the two mathematical parameters over the range of values of the selected earth formation property.

Apparatus for implementing the techniques disclosed herein is now discussed. Reference may now be had to FIG. 1. FIG. 1 illustrates an exemplary embodiment of a well logging instrument 10 (also referred to as a "tool") for wireline logging shown disposed in a wellbore 1 (also referred to as a borehole). The wellbore 1 generally traverses a formation 3 that can include various intervals or layers shown as 3A, 3B and 3C. One skilled in the art will recognize that the various geological features as may be encountered in a subsurface environment may be referred to as "formations." As used herein the term "formation" also includes the subsurface materials that makeup the formation. For example, the formation can include a rock matrix of pores filled with one or more fluids such as water, oil or gas and the like. The fluids can also include an enhanced oil recovery fluid such as a polymer. Non-limiting examples of materials forming the rock matrix include sandstone, limestone, dolomite, or combinations of other rocks or minerals. As a matter of convention, a depth of the wellbore 1 is described along a Z-axis, while a cross-section is provided on a plane described by an X-axis and a Y-axis. Prior to well logging with the logging instrument 10, the wellbore 1 is drilled into the Earth 2 using a drilling rig.

The logging instrument 10 is lowered into the wellbore 1 using a wireline 8 deployed by a derrick 6 or similar equipment. Generally, the wireline 8 includes suspension apparatus, such as a load bearing cable, as well as other apparatus. The other apparatus may include a power supply, a communications link (such as wired or optical) and other such equipment. Generally, the wireline 8 is conveyed from a service truck 9 or other similar apparatus (such as a service station, a base station, etc. . . . ). Often, the wireline 8 is coupled to topside equipment 7. The topside equipment 7 may provide power to the logging instrument 10, as well as provide computing and processing capabilities for at least one of control of operations and analysis of data. Hence, the topside equipment 7 includes a computer processing system 5. In another embodiment, the logging tool 10 is conveyed through the borehole 1 by a drill string or coiled tubing while the borehole 1 is being drilled in a technique referred to as logging-while-drilling (LWD). In LWD, the logging tool 10 performs measurements while the borehole is being or during a temporary halt in drilling. In another embodiment referred to as "memory logging," measurements are stored in a removable or downloadable memory disposed in the logging tool 10. Hence, the measurements can be retrieved when the logging tool 10 is removed from the wellbore 1.

The wellbore 1 as shown in FIG. 1 is lined with a casing 4 to preserve the integrity of the wellbore 1. Non-limiting embodiments of materials for the casing 4 include metals such as steel, concrete, cement, or any combination thereof. In completing the well, it is advantageous to install the casing 4 quickly after the wellbore 1 is drilled before damage can occur. Thus, time may not be available to perform open well logging (i.e., without a casing). Therefore, the logging tool 10 includes pulsed-neutron logging components 15 for logging through the casing 4. The pulsed-neutron logging components 15 may communicate with downhole electronics 13 and/or the topside equipment 7.

Figure 2:
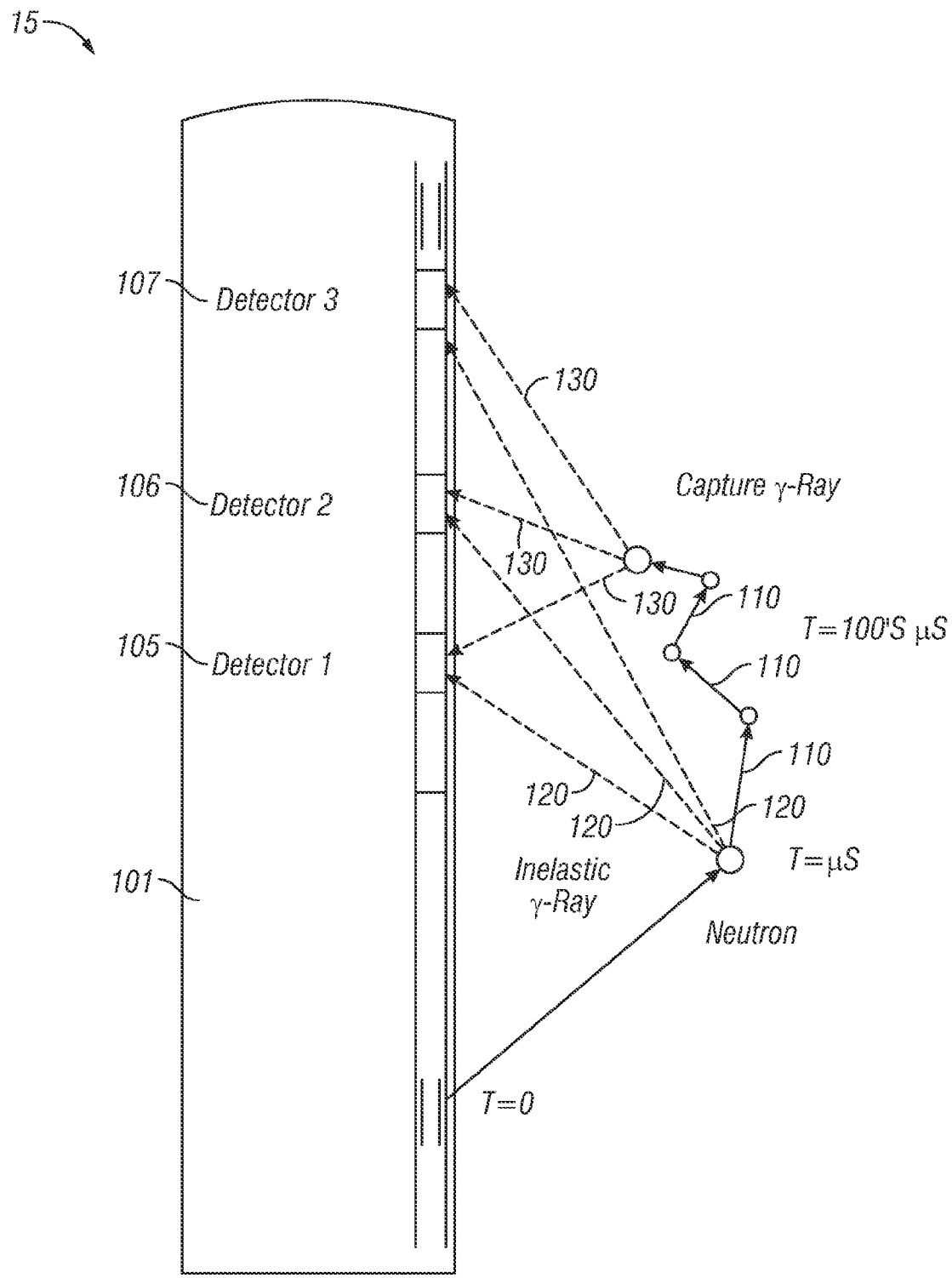
FIG. 2 illustrates an exemplary embodiment of pulsed-neutron logging components disposed at the pulsed-neutron logging instrument.

Reference may now be had to FIG. 2, which illustrates an exemplary embodiment of the pulsed-neutron logging components 15 in the logging tool 10. The logging tool 10 shown in FIG. 2 is that of the Reservoir Performance Monitor (RPM) instrument of Baker Hughes Incorporated. The components 15 include a neutron source 101 and three axially aligned spaced apart detectors described below. The number of detectors shown in the embodiment of FIG. 2 is only an example of the number of detectors employed in an embodiment of the present invention. It is not a limitation on the scope of the present invention. The pulsed-neutron logging components of the present invention may include two or more detectors. The neutron source 101 may be pulsed at different frequencies and modes for different types of measurements. The short-spaced (SS) detector 105 is closest to the source 101. The long-spaced (LS) detector is denoted by 106, and the furthest detector 107 is referred to as the extra-long spaced (XLS) detector. Fast neutrons (approximately 14 MeV) are emitted from the source 101 and enter the borehole and formation, where they undergo several types of interactions. During the first few microseconds (µs), before they lose much energy, some neutrons are involved in inelastic scattering with nuclei in the borehole and formation and produce gamma rays. These inelastic gamma rays 120 have energies that are characteristic of the atomic nuclei that produced them. The atomic nuclei found in this environment include, for example, carbon, oxygen, silicon, calcium, and some others. It can be appreciated that the gamma ray detectors can be disposed within a body of the logging tool 10 or external to the body (e.g., such as either above or below the tool).

Two or more gamma-ray detectors are employed, in one or more modes of operation. Such modes include, but are not limited to, a pulsed neutron capture (e.g., sigma) mode, a pulsed neutron inelastic (e.g., carbon/oxygen or C/O) mode, and a pulsed neutron holdup imager mode. In a pulsed neutron capture mode, for example, the tool pulses at 1 kHz, and records a complete time spectrum for each detector. An energy spectrum is also recorded for maintaining energy levels. Time spectra from short-spaced and long-spaced detectors can be processed individually to provide traditional thermal neutron capture cross section sigma information, or the two spectra can be used together to automatically correct for borehole and diffusion effects and produce results substantially approximating intrinsic formation sigma values.

In the pulsed neutron inelastic (C/O) mode, the instrument pulses at 10 kHz, for example, and records full inelastic and capture gamma ray energy spectra from each detector. These data are processed to determine elemental ratios including carbon/oxygen and calcium/silicon from the inelastic spectra and silicon/calcium from the capture spectra.

In an embodiment of the present invention, a pulsed neutron generator with improved reliability and higher output is coupled with high-speed downhole microprocessor-controlled drivers and detector electronics. The system supports multiple frequency operation and different detection gate timings to make the different measurements. The modes of operation can be selected from the surface with no need to pull the tool out of the well.

One advantage of the present invention is that the logging tool 10 with certain spacing of the radiation detectors can perform all pulsed-neutron logging measurements required for estimating saturation in a single pass through the borehole at a speed of ten feet per minute.

After just a few microseconds (µs), most of the neutrons emitted by the source 101 are slowed by either inelastic or elastic scattering until they reach thermal energies, about 0.025 eV. This process is illustrated schematically in FIG. 2 as the sequence of solid arrows 110. At thermal energies, neutrons continue to undergo elastic collisions, but they no longer lose energy on average. A few µs after the neutron generator shuts off, the process of thermalization is complete. Over the next several hundred µs, thermal neutrons are captured by nuclei of various elements—again producing gamma rays, known as capture gamma rays 130. A capture gamma ray energy spectrum yields information about the relative abundances of these elements. The inelastic gamma rays are depicted by 120. Because inelastic gamma rays 120 are generated before the capture gamma rays 130, it is possible to identify and measure separately to obtain inelastic gamma ray spectra and capture gamma ray spectra.

Calculating or determining the mathematical parameters is now discussed. The mathematical parameters can be calculated or determined from the measurements made by one or more of the various radiation detectors. For example, the first mathematical parameter also referred to herein as $R_{IN}$ is the ratio of the measurement of gamma rays detected by the SS detector 105 due to inelastic scattering to the measurement of gamma rays detected by the XLS detector 107 due to inelastic scattering. The second mathematical parameter also referred to herein as $R_{CAP}$ is the ratio of the measurement of gamma rays detected by the SS detector 105 due to neutron capture to the measurement of gamma rays detected by the XLS detector 107 due to neutron capture. Other ratios may also be used for the mathematical parameters. For example, ratios can be calculated using the measurement of the SS detector 105 divided by the measurement of the LS detector 106 for both inelastic scattering and neutron capture similar to the $R_{IN}$ and $R_{CAP}$ described above. As another example, the ratios can use measurements made by the LS detector 106 and the XLS detector 107. The ratios can also be inverted in other embodiments. Other examples of mathematical parameters include sigma or carbon/oxygen ratio, which can be measured using a single detector.

Figure 3:
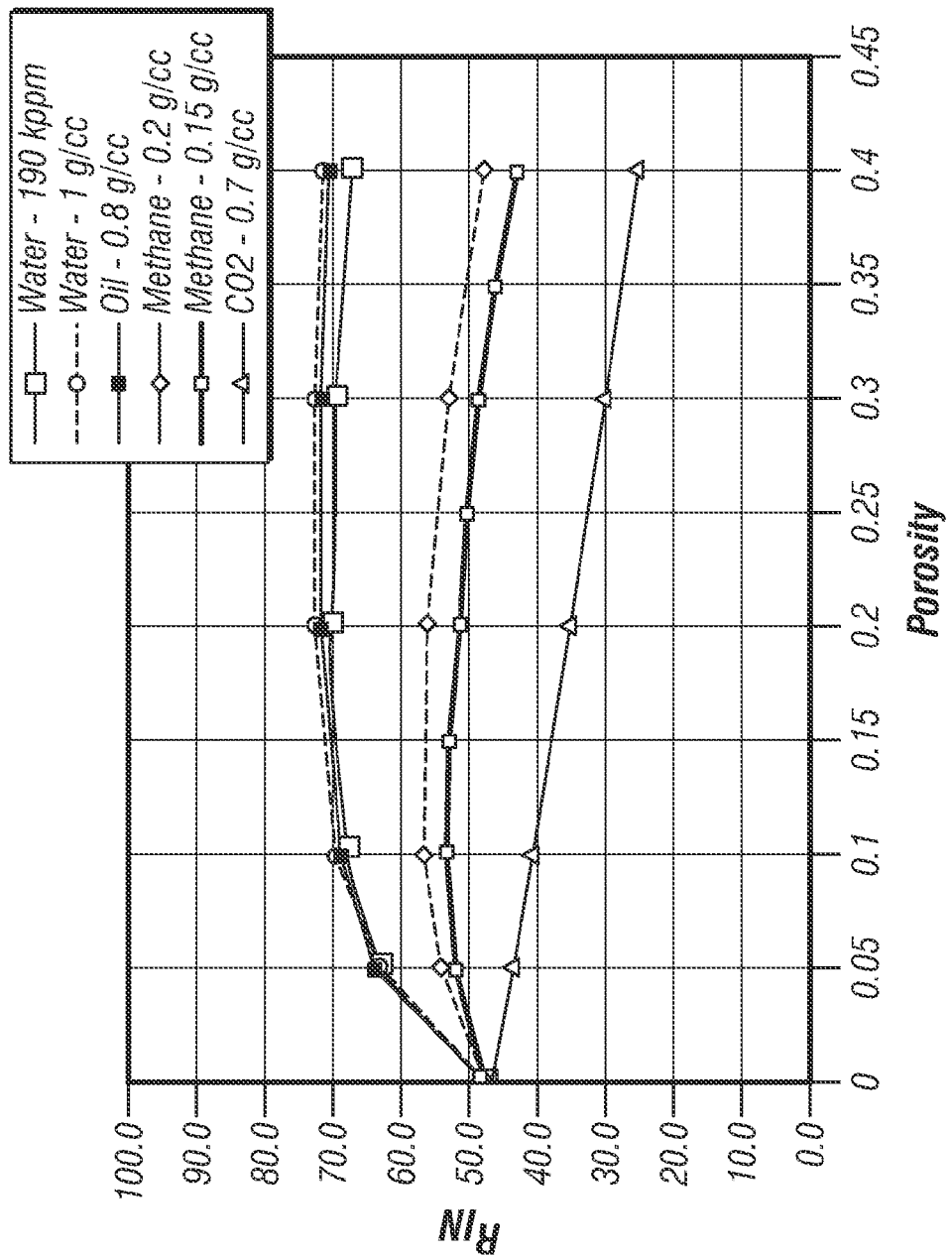
FIG. 3 illustrates an exemplary graph of a first ratio of gamma rays due to inelastic scattering received by a first detector to gamma rays due to inelastic scattering received by a second detector versus porosity.
Figure 4:
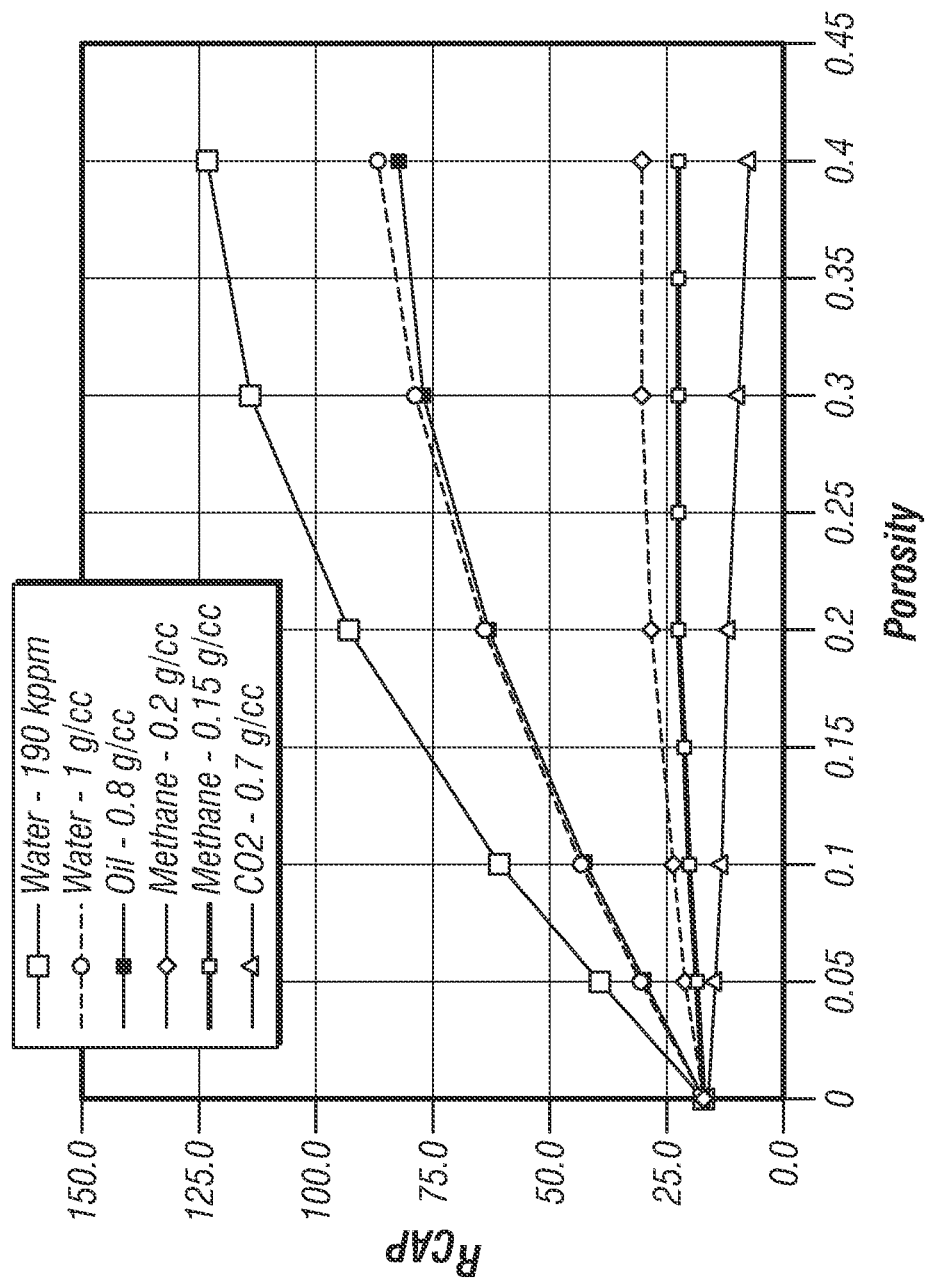
FIG. 4 illustrates an exemplary graph of a second ratio of gamma rays due to thermal neutron capture received by the first detector to gamma rays due to thermal neutron capture received by the second detector versus porosity.

Predicting values of the mathematical parameters is now discussed. FIGS. 3 and 4 depict aspects of one phase of predicting the saturation lines discussed above. FIG. 3 illustrates an exemplary graph of $R_{IN}$ versus porosity. FIG. 4 illustrates an exemplary graph of $R_{CAP}$ versus porosity. These graphs were developed for five different fluids—salt water (190 kppm NaCl), fresh water (1 g/cc, Oil (0.8 g/cc), methane gas (0.2 g/cc), methane gas (0.15 g/cc) and carbon dioxide (0.7 g/cc). A Monte Carlo simulation was used to develop these graphs using known data about the well, the earth formation, and the tool 10.

Figure 5:
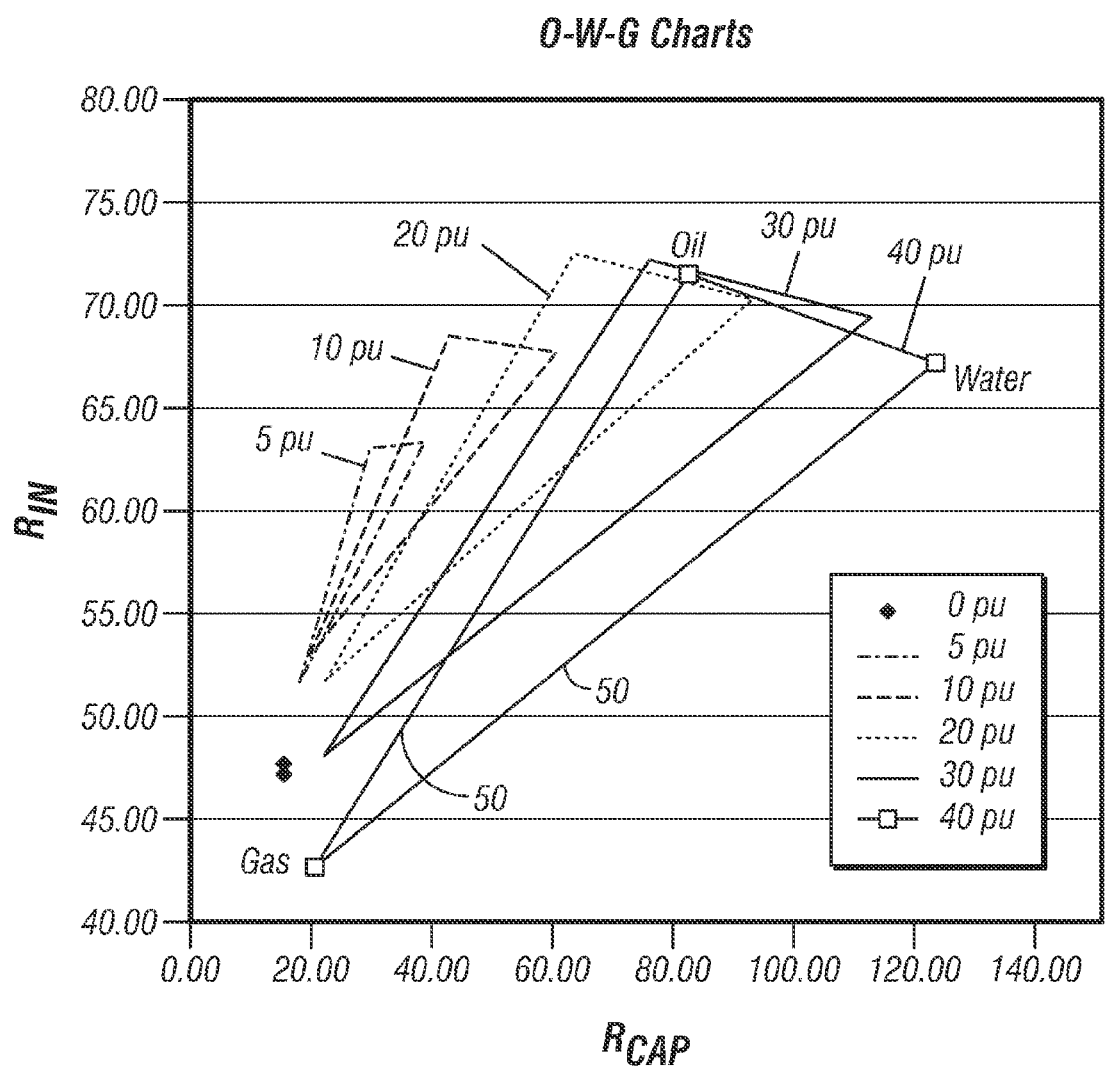
FIG. 5 illustrates an exemplary graph of the first ratio versus the second ratio for different porosities.

In another phase of predicting the saturation lines, the data from the graphs for oil water and gas in FIGS. 3 and 4 is cross-plotted on one graph (a cross-plot graph) for selected values of the earth formation property, which is porosity for illustrative purposes. Exemplary cross-plot graphs are shown in FIG. 5 for 0 pu (porosity units), 5 pu, 10 pu, 20 pu, 30 pu and 40 pu. Each cross-plot graph is a triangle bounded by two-phase saturation lines 50. These saturation lines 50 are established for all combinations of two of the three fluids. Each saturation line 50 is formed from two end points or vertices relating to 100% saturation of one of the fluids. The end points correspond to the data predicted by the Monte Carlo simulation. In embodiments, where the 100% saturation points are not available, then the end points can be extrapolated.

Figure 6:
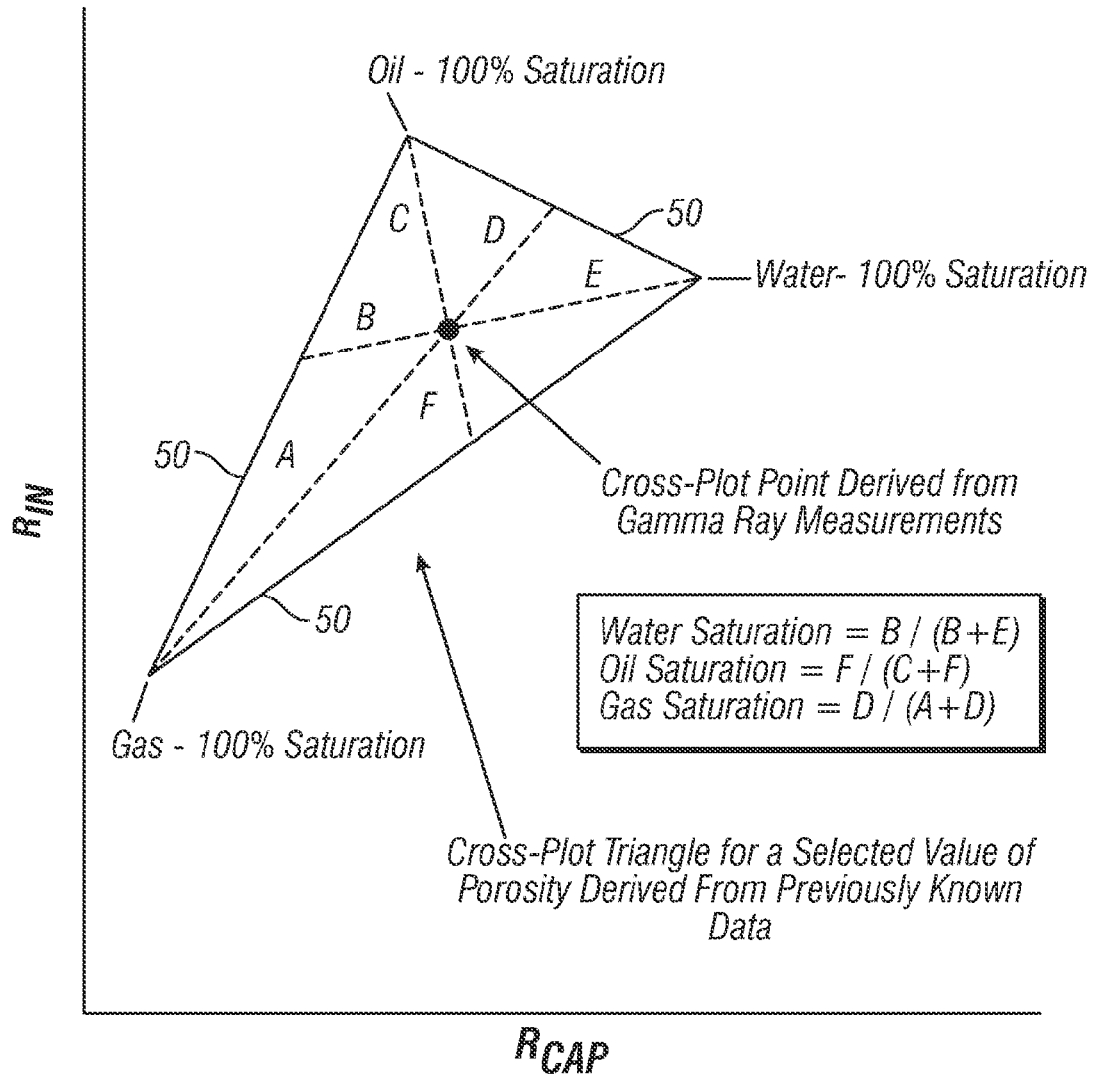
FIG. 6 depicts aspects of linearly interpolating the saturation of three fluids from three two-phase saturation lines forming a triangle.

Estimating the saturation of each of the three fluids represented in the cross-plot graph is now discussed. An exemplary cross-plot graph representing oil, water and gas saturation in the formation for one value of porosity is shown in FIG. 6. The porosity at various depths is known from previous logging, sampling or analysis. Hence, $R_{IN}$ and $R_{CAP}$, calculated from measurements at a known depth, can be associated with the known porosity at that depth. By knowing the porosity at that depth, the appropriate cross-plot graph from FIG. 5 can be selected. The mathematical parameters $R_{IN}$ and $R_{CAP}$ derived from the measurements by the detectors 105 and 107 can be plotted as a point on the graph as shown in FIG. 6.

Other non-limiting examples of cross-plot combinations include $R_{IN}$ vs. sigma and $R_{CAP}$ vs. sigma, $R_{IN}$ vs. C/O.

If the plotted point corresponds to a vertex, then there is 100% percent saturation of the fluid represented by that vertex. If the plotted point falls on one saturation line 50 between two vertices, then the amount of saturation is interpolated between the two vertices to determine the relative amount of saturation of one fluid with respect to the other fluid. If the plotted point falls within the triangle of saturation lines 50, then the amount of saturation of each of the three fluids with respect to the other fluids is interpolated between the three vertices of the triangle. The relative amount of saturation of each fluid with respect to the other fluid represented on the saturation line 50 can be written as a linear or non-linear equation, depending upon the choice of mathematical parameters. The triangle plot shows three equations as geometrical transforms. Mathematically, there are three equations. Two equations for the two mathematical parameters (i.e., one for each mathematical parameter) and a third equation that is a sum of all the saturations and equal to one. These three equations lead to the solution for three unknowns. Thus, the three unknowns (i.e., oil saturation, water saturation and gas saturation) can be determined. In one embodiment, the oil, water and gas saturation equations presented in FIG. 6 can also be used to determine the saturations.

In some embodiments, portions of one or more saturation lines 50 may not be complete. In these embodiments, complete saturation lines 50 can be extrapolated. In general, the values of saturation along the saturation line are nonlinear to varying degrees. Thus, nonlinear interpolation and/or extrapolation will generally yield a more accurate result than linear interpolation and/or extrapolation.

Figure 7:
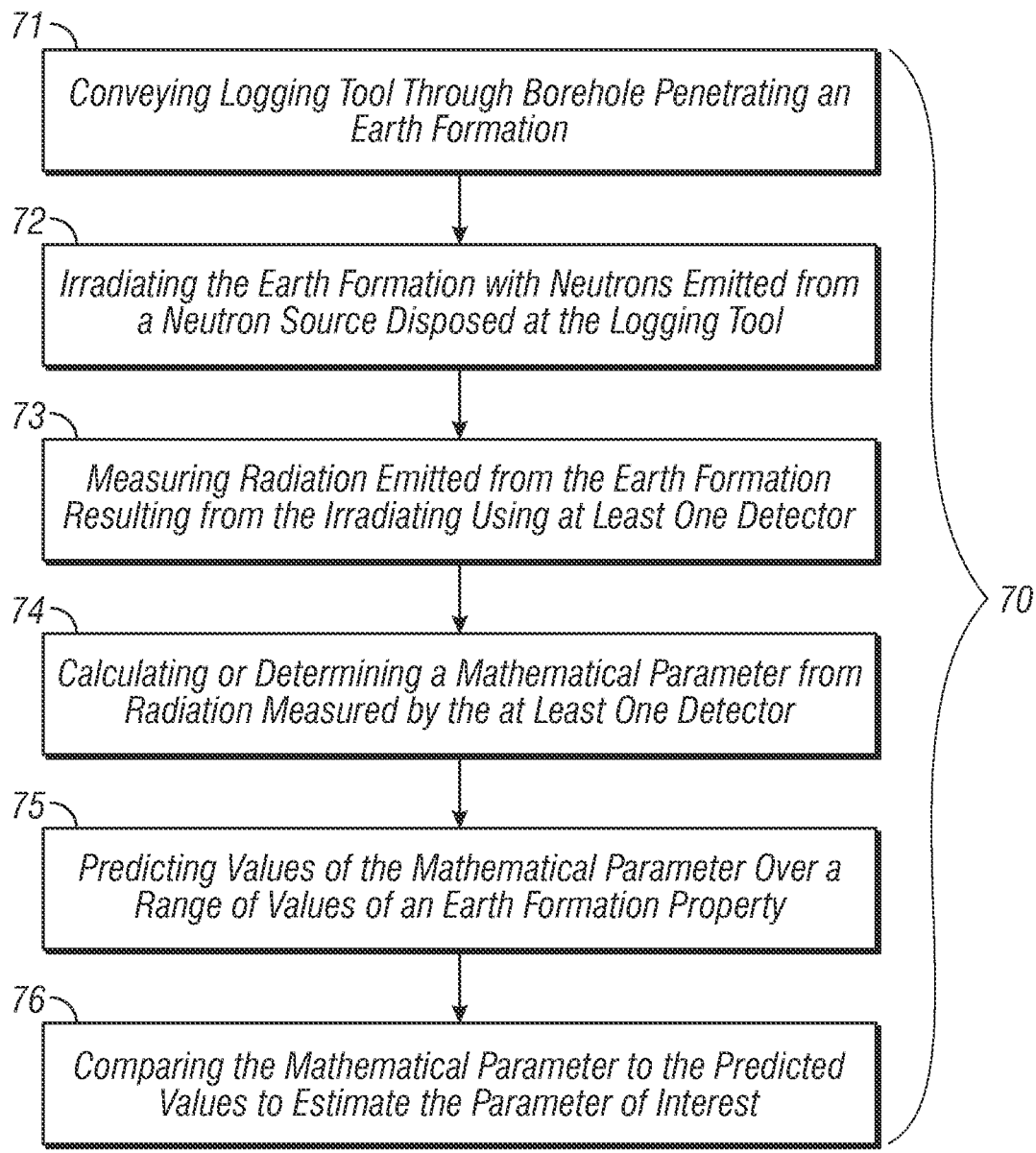
FIG. 7 presents one example of a method for estimating a parameter of interest of the earth formation.

FIG. 7 presents one example of a method 70 for estimating a parameter of interest of the earth formation. In one embodiment, the earth formation 3 contains one or more fluids in pores of the formation 3. The method 70 calls for (step 71) conveying the logging tool 10 through the borehole 1 penetrating the earth formation 3. Further, the method 70 calls for (step 72) irradiating the earth formation 3 with neutrons from the neutron source 101 disposed at the tool 10. Further, the method 70 calls for (step 73) measuring radiation emitted from the earth formation 3 resulting from the irradiating using at least one detector. The at least one detector can be at least two of the detectors 105, 106, and 107 in one embodiment. Further, the method 70 calls for (step 74) calculating or determining a mathematical parameter from radiation measured by the at least one detector. The mathematical parameter can be two mathematical parameters such as the $R_{IN}$ and $R_{CAP}$ mathematical parameters or the sigma and the carbon/oxygen ratio, for example. In one embodiment, the mathematical parameters can be a function of the measurements performed by any one detector and the measurements performed by any other or more detectors for inelastic scattering and/or neutron capture processes. Further, the method 70 calls for (step 75) predicting values of the mathematical parameter over a range of values of an earth formation property such as porosity. The earth formation property is not the parameter of interest, but generally a known property that may be a function of depth. The values are predicted from known information about the earth formation 3, the borehole 1, and response characteristics of the detectors used for measuring the emitted radiation. Further, the method 70 calls for (step 76) comparing the mathematical parameter to the predicted values to estimate the parameter of interest. This step can include interpolating or extrapolating the predicted values to estimate the parameter of interest when the mathematical parameter is not close to or exactly one of the predicted values of the mathematical parameter.

While the techniques presented above used graphs to present and interpret data, it is recognized that the data may be processed by a processor such as may be included in the topside equipment 7 or the downhole electronics 13 without the need to present the data in graphical form. Hence, it is inherent that step 76 in the method 70 can include (1) graphical interpolation or extrapolation or (2) numerical calculation for the interpolation or extrapolation such as by matrix algebra or numerical substitution, as non-limiting embodiments. In order to aid a user in interpreting output from the apparatus, the data may be presented to the user in graphical form via a user interface.

It can be appreciated that three or more different measurements of radiation can be used to estimate one or more parameters of interest of the earth formation 3. For example, four different measurements can be used to estimate three, two, or one formation parameters. In one embodiment, four formation fluids may be present and represented by four two-phase saturation lines. A graphical representation of these four saturation lines can be a pyramid shape in one non-limiting example.

In support of the teachings herein, various analysis components may be used, including a digital and/or an analog system. For example, the topside equipment 7, the computer processing system 5 or the downhole electronics 13 may include the digital and/or analog system. The system may have components such as a processor, storage media, memory, input, output, communications link (wired, wireless, pulsed mud, optical or other), user interfaces (keyboard, mouse, display, printout or other), software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit, electromechanical unit, pulsed neutron generator or chemical neutron generator may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. The logging tool 10 is one non-limiting example of a carrier. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for estimating a saturation for each of a gas, oil and water in a fluid contained in pores of an earth formation, the method comprising:
   conveying a carrier through a single borehole penetrating the earth formation;
   irradiating the earth formation with neutrons from a neutron source disposed at the carrier;
   measuring radiation emitted from the earth formation resulting from the irradiating using at least one detector;
   calculating or determining a mathematical parameter from radiation measured by the at least one detector;
   predicting values of the mathematical parameter over a range of values of an earth formation property to establish a first two-phase saturation line relating saturation of the gas to the oil, a second two-phase saturation line relating saturation of the oil to the water, and a third two-phase saturation line relating saturation of the water to the gas, wherein the first, second and third saturation lines define a triangle; and
   comparing the mathematical parameter to the predicted values of the triangle to estimate the saturation of the gas, oil and water in the earth formation fluid.

2. The method of claim 1, wherein the borehole comprises at least one of a cased borehole and an open borehole.

3. The method of claim 1, wherein the radiation comprises gamma rays due to inelastic scattering of the neutrons and gamma rays due to capture of the neutrons having thermal energy.

4. The method of claim 3, wherein the at least one detector comprises at least a first detector and a second detector spaced a distance from the first detector and the mathematical parameter comprises a first mathematical parameter comprising a ratio of gamma rays due to inelastic scattering detected by the first detector to gamma rays due to inelastic scattering detected by the second detector and a second mathematical parameter comprising a ratio of gamma rays due to thermal neutron capture detected by the first detector to gamma rays due to thermal neutron capture detected by the second detector.

5. The method of claim 4, wherein the earth formation property comprises at least one selection from a group consisting of porosity, mineral volume and rock volume.

6. The method of claim 4, wherein the predicting comprises predicting the first mathematical parameter and the second mathematical parameter for the gas, the oil and the water.

7. The method of claim 6, further comprising relating the first mathematical parameter to the second mathematical parameter for selected values of the earth formation property to establish: the first two-phase saturation line, the second two-phase saturation line, and the third two-phase saturation line.

8. The method of claim 7, wherein each of the three vertices of the triangle uniquely represents one hundred percent saturation of one of the three fluids.

9. The method of claim 8, wherein the comparing comprises at least one of a linear interpolation, a nonlinear interpolation, a linear extrapolation, and a nonlinear extrapolation between the three vertices of the triangle.

10. The method of claim 1, wherein the mathematical parameter comprises a first mathematical parameter and a second mathematical parameter, the first mathematical parameter and the second mathematical parameter each comprising a unique selection from a group consisting of:
   a sigma derived from a radiation measurement of the at least one detector;
   a ratio of carbon to oxygen derived from a radiation measurement of the at least one detector;
   a ratio of gamma rays due to inelastic scattering detected by the at least one detector to gamma rays due to inelastic scattering detected by another detector spaced a distance from the at least one detector; and
   a ratio of gamma rays due to thermal neutron capture detected by the at least one detector to gamma rays due to thermal neutron capture detected by another detector spaced a distance from the at least one detector.

11. The method of claim 10, wherein the gas comprises at least one of methane, a hydrocarbon gas heavier than methane, and carbon dioxide and water comprises at least one of saline water and an enhanced oil recovery fluid.

12. The method of claim 10, further comprising relating the first mathematical parameter to the second mathematical parameter for selected values of the earth formation property to establish:
   the first two-phase saturation line between the gas at one hundred percent saturation and the oil at one hundred percent saturation;
   the second two-phase saturation line between the oil at one hundred percent saturation and the water at one hundred percent saturation; and
   the third two-phase saturation line between the water at one hundred percent saturation and the gas at one hundred percent saturation.

13. The method of claim 12, wherein the first, second and third saturation lines are linear or non-linear and form a triangular configuration having three vertices.

14. The method of claim 13, wherein the comparing comprises interpolating between the three vertices to determine a saturation for each of the gas, the oil, and the water.

15. The method of claim 1, wherein the predicting comprises using at least one of a formation mineralogy, a formation porosity, a formation fluid density, a borehole fluid density, a borehole diameter, a casing diameter, an equation of state, and a response characteristic of the at least one detector.

16. An apparatus for estimating a saturation for each of a gas, oil and water in a fluid contained in pores of an earth formation, the apparatus comprising:
a carrier configured to be conveyed through a borehole penetrating the earth formation;
a neutron source disposed at the carrier and configured to irradiate the earth formation;
at least one detector configured to measure radiation emitted from the earth formation resulting from the irradiating; and
a processor configured to:
calculate or determine a mathematical parameter from radiation measured by the at least one detector;
predict values of the mathematical parameter over a range of values of an earth formation property to establish a first two-phase saturation line relating saturation of the gas to the oil a second two-phase saturation line relating saturation of the oil to the water, and a third two-phase saturation line relating saturation of the water to the gas, wherein the first, second and third saturation lines define a triangle; and
compare the mathematical parameter to the predicted values of the triangle to estimate the saturation of the gas, oil and water in the earth formation fluid.

17. The apparatus of claim 16, wherein the borehole comprises a cased borehole.

18. The apparatus of claim 16, wherein the carrier comprises at least one of a wireline, a slickline, a drillstring and coiled tubing.

19. The apparatus of claim 16, wherein the neutron source is a pulsed neutron source.

20. The apparatus of claim 16, wherein the earth formation property is at least one of porosity, mineral volume and rock volume.

21. A non-transitory machine-readable storage medium for use with an apparatus for estimating a saturation for each of a gas, oil and water in a fluid contained in pores of an earth formation, the apparatus comprising:
a source of radiation configured to be conveyed in a borehole penetrating the earth formation and to irradiate the earth formation; and
at least one detector configured to produce signals indicative of results of interactions of the radiation with nuclei of the earth formation;
the medium comprising instructions, which enable a processor to:
calculate or determine a mathematical parameter from radiation measured by the at least one detector;
predict values of the mathematical parameter over a range of values of an earth formation property to establish a first two-phase saturation line relating saturation of the gas to the oil, a second two-phase saturation line relating saturation of the oil to the water, and a third two-phase saturation line relating saturation of the water to the gas, wherein the first, second and third saturation lines define a triangle; and
compare the mathematical parameter to the predicted values of the triangle to estimate the saturation of the gas, oil and water in the earth formation fluid.

* * * * *